United States Patent [19]

Ali

[11] 4,324,000
[45] Apr. 6, 1982

[54] TERMINATION CIRCUIT FOR FDM/TDM PROCESSORS

[75] Inventor: Zaheer M. Ali, Santa Maria, Calif.

[73] Assignee: Communications Satellite Corporation, Washington, D.C.

[21] Appl. No.: 110,590

[22] Filed: Jan. 9, 1980

[51] Int. Cl.³ .............................. H04J 1/05; H04J 3/02
[52] U.S. Cl. .......................................... 370/85; 370/70; 370/92
[58] Field of Search ...................... 370/92, 70, 83, 109, 370/85, 77

[56] References Cited

U.S. PATENT DOCUMENTS

| | | | |
|---|---|---|---|
| 3,912,872 | 10/1975 | Callens | 370/92 |
| 3,914,553 | 10/1975 | Meldind et al. | 340/347 DD |
| 4,079,372 | 3/1978 | Koenig | 340/347 DD |
| 4,082,922 | 4/1978 | Chu | 370/83 |
| 4,093,823 | 6/1978 | Chu | 370/92 |
| 4,103,110 | 7/1978 | Picquendar et al. | 364/724 |

FOREIGN PATENT DOCUMENTS 2657878  6/1978  Fed. Rep. of Germany ........ 370/92

Primary Examiner—Douglas W. Olms
Attorney, Agent, or Firm—Sughrue, Mion, Zinn, Macpeak & Seas

[57] ABSTRACT

An interface circuit is provided to convert serial, 30 channel, compressed, sign magnitude FDM-PCM data provided by a pair of voice communication codecs (code/decode) into parallel, 60 channel, expanded (linear), 2's complement PCM data, so that it can be used in an FDM/TDM processor. The conversion process is reversed on the return of data from the FDM/TDM processor to the codecs. A unique method of read/write and memory address control provides specific ordering of data and alternating two-way data flow in rapid succession.

11 Claims, 6 Drawing Figures

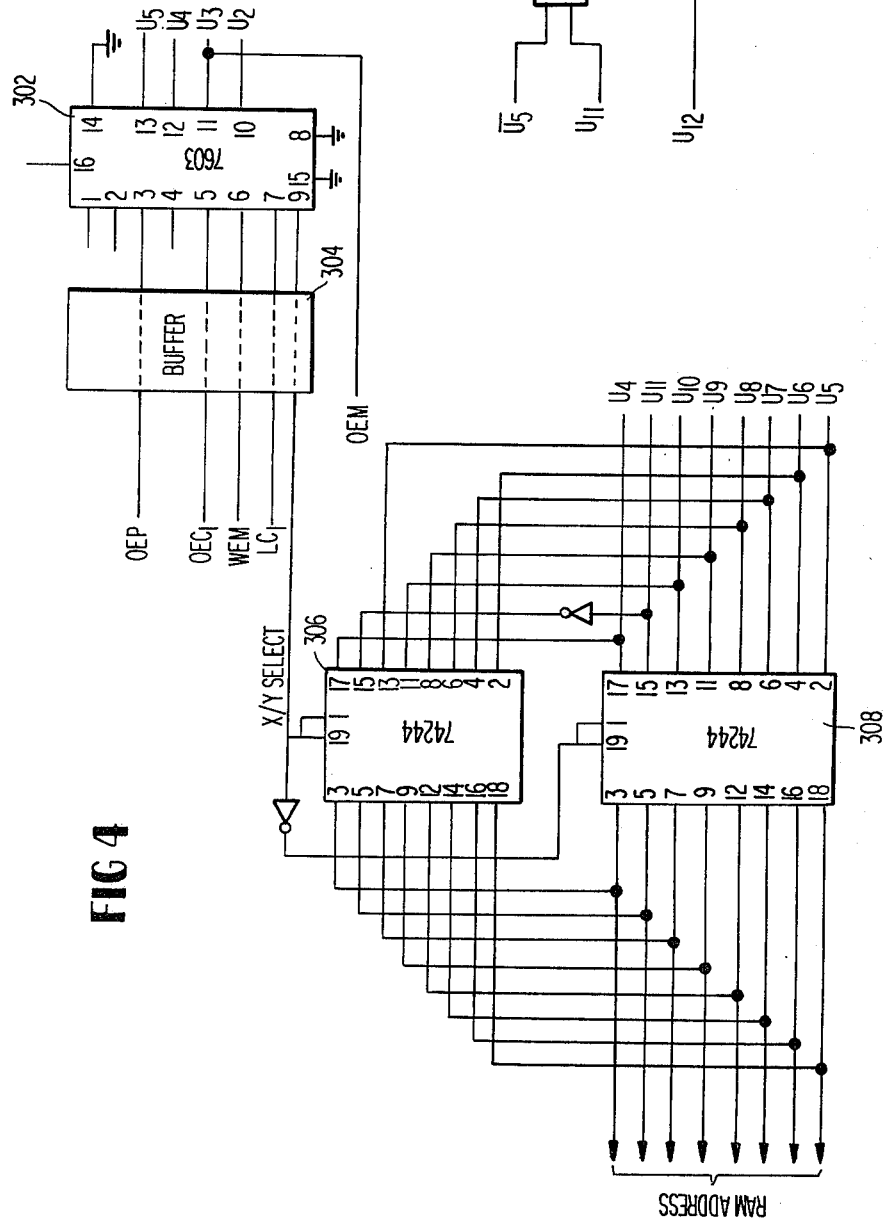
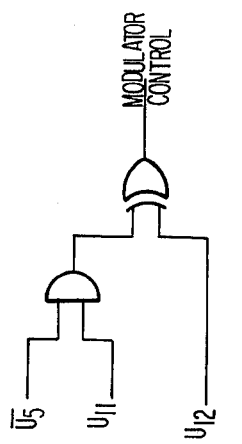

TERMINATION CIRCUIT FOR FDM/TDM PROCESSORS

CROSS REFERENCES TO RELATED APPLICATIONS

The present invention is designed to be used in accordance with the FDM/TDM Processor disclosed in a commonly assigned U.S. Pat. No. 4,199,660. The compressor features of the present invention may be implemented using the disclosure of commonly assigned co-pending U.S. Patent Application Ser. No. 110,716 filed concurrently herewith.

BACKGROUND OF THE INVENTION

This invention is related to the field of satellite communications and particularly directed to an apparatus for interfacing time division multiplex signals provided by data gathering codecs with an FDM/TDM processor as disclosed in co-pending U.S. Patent Application Ser. No. 849,584 now U.S. Pat. No. 4,199,660. The FDM/TDM processor is becoming an increasingly important part of communications sytems implementation in both terrestrial and space communications. The FDM/TDM processor according to the co-pending application is a 60 channel unit while commercially available data gathering PCM codecs (such as Ericsson ZAK 30/52) are 30 channels each. The codecs operate on serial, compressed, sign magnitude data while the FDM/TDM processor operates on parallel, linear, 2's complement data.

Various techniques of interfacing serial and parallel systems are generally known in the communications art. Picquendar (U.S. Pat. No. 4,103,110) uses registers to convert PCM serial data into parallel data, and a transmultiplexer for converting parallel data to serial. Melindo et al (U.S. Pat. No. 3,914,553) uses orthogonal matrices to convert serial to parallel data in a PCM/TDM terminal. Shift registers are used in the orthogonal matrices as conversion units.

SUMMARY OF THE INVENTION

It is an object of the invention to provide a circuit for interfacing data received from a plurality of codecs with an FDM/TDM processor so as to enable the processor to receive data from and deliver data to the plurality of codecs.

This object is achieved by providing two codecs each having 30 channels. The data from each of the codecs is converted from serial to parallel form using a plurality of registers and delivered to a random access memory via a tri-state bus where the 30 channels of data from each codec are sequentially arranged under the control of an address generator. The data is read out under the control of the address generator so as to effectively produce 60 sequential channels of parallel data. The data is delivered from the codecs to the memory, from the memory to the processor, from the processor back to the memory, and from the memory to the codecs in rapid succession.

The compressed data transferred from the random access memory to the processor is modulated to provide for further simplification of FDM/TDM processing, expanded to produce linear data, and converted from sign magnitude to 2's complement format. Data returning from the processor to the random access memory is converted from 2's complement format to sign magnitude and compressed to provide a data format which is compatible with the codecs.

In so modulating the sign magnitude data, only a single bit from the modulated data words need be considered for processing. By compressing the data delivered from the FDM/TDM processor, the size requirements of the random access memory are accordingly reduced.

DESCRIPTION OF THE DRAWINGS

FIG. 4 illustrates the address and control signal generating circuits.

FIG. 6 illustrates the modulator control circuitry.

DETAILED DESCRIPTION

Figure 1:
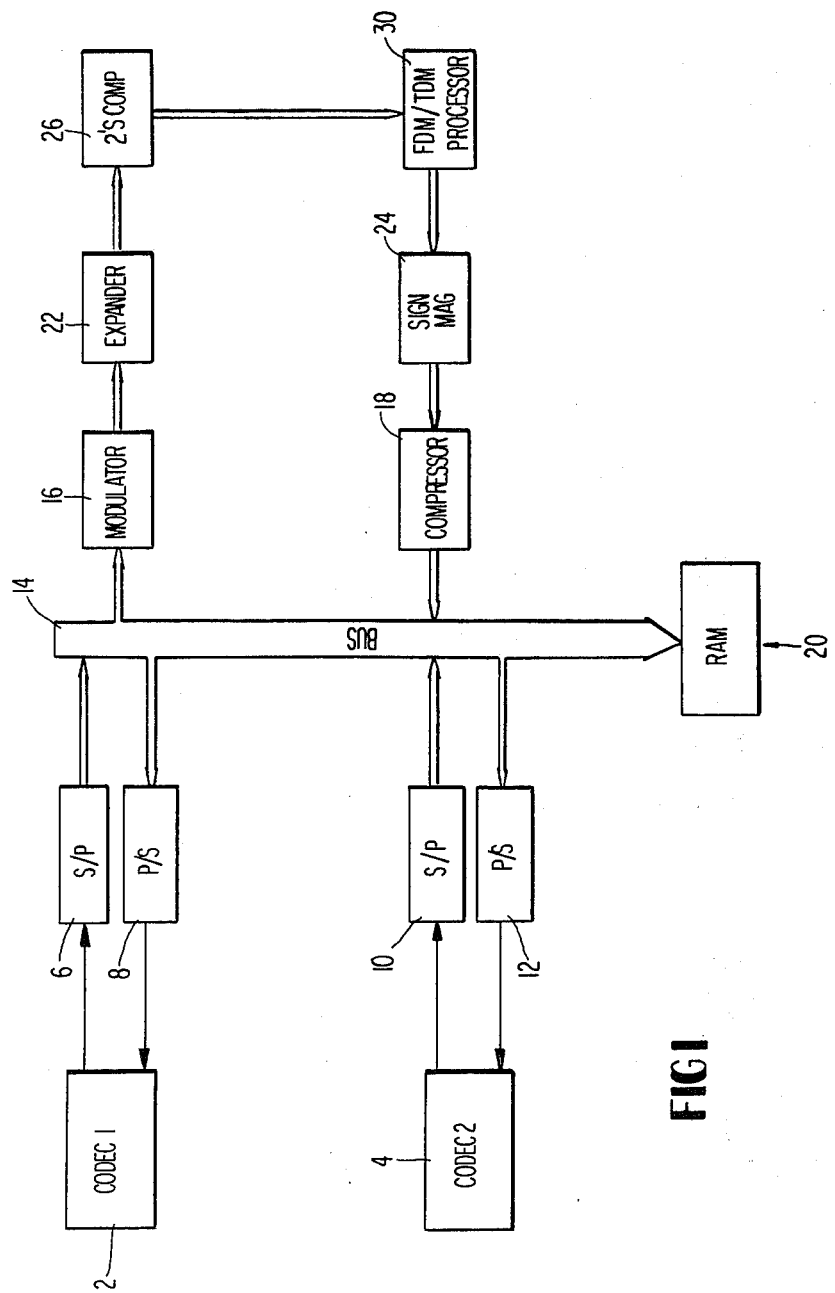
FIG. 1 is a functional illustration of the basic data processing and data flow within the interfacing circuit.

FIG. 1 illustrates the basic configuration of the interface and the associated data flow from codecs 2 and 4 to FDM/TDM processor 30, and the return path from the processor 30 to codecs 2 and 4. Data from each of the codecs are converted from serial to parallel format in converters 6 and 10. The serial to parallel converters 6 and 10 operate on a single channel of data from codec 2 and 4 at any given time, and sequentially process the full 30 channels of data from each of the codecs. The parallel data provided at converters 6 and 10 are sequentially strobed on tri-state bus 14 and delivered to random access memory 20 where the 30 channels from codecs 2 and 4 are written into the memory 32 memory locations apart. That is, the first channel from codec 2 is located 32 memory locations from the first channel of codec 4, the second channel of codec 2 and the second channel of codec 4 are separated by 32 memory locations, etc. Although each codec originally has only 30 TDM-PCM voice channels, an additional two "unique word" channels 0 and 16 are provided for each codec due to the binary nature of the system. The data words stored in the RAM 20 are read out to modulator circuit 16 in rapid succession in order to simulate a continuous 64 channel input to the processor.

The modulator 16 operates upon the sign magnitude data to effect a 2 KHz frequency upshift of the even numbered voice channels and a 2 KHz frequency downshift of the odd numbered voice channels. This frequency shifting is required in the FDM/TDM processor disclosed in the co-pending U.S. Patent Application Ser. No. 849,584, the disclosure of which is hereby incorporated by reference. In the FDM/TDM processor, the respective frequency upshifting and downshifting is accomplished by complementing selected PCM words for each of the voice channels. It can be seen however that the interfacing circuit of the subject invention more readily lends itself to this function than the apparatus disclosed in the co-pending application since the interfacing circuit of FIG. 1 at modulator 16 has sign magnitude data applied thereto as opposed to the 2's complement data applied to the FDM/TDM processor. The sign magnitude data received at modulator 16 requires only the sign bit from the PCM word to be changed, as opposed to complementing the entire PCM word in 2's complement format. Modulating the data at the interface thus saves at least four integrated circuit chips.

The data is delivered from modulator 16 to expander 22 where the compressed data provided by the codecs is expanded to linear form in order to be compatible with the FDM/TDM processor. The linear modulated data is then applied to circuit 26 which converts the sign magnitude data into 2's complement data. The data is then delivered to the FDM/TDM processor as generally disclosed in U.S. Patent Application Ser. No. 849,584.

The processed data is delivered from the processor 30 to circuit 24 which converts the 2's complement data to sign magnitude form. The data is compressed in circuit 18 so that it is compatible with the codec apparatus and then delivered via tri-state bus 14 to random access memory 20. The data from compressor 18 is in an ordered form so as to simulate 64 consecutive channels of PCM/TDM data. The data is separately delivered from the RAM 20 to parallel to serial converters 8 and 12 under the control of address generating means to be described below. The address generating means causes the memory 20 to deliver data to the converters 8 and 12 so that codecs 2 and 4 receive their respective 32 ordered channels of data.

Figure 2:
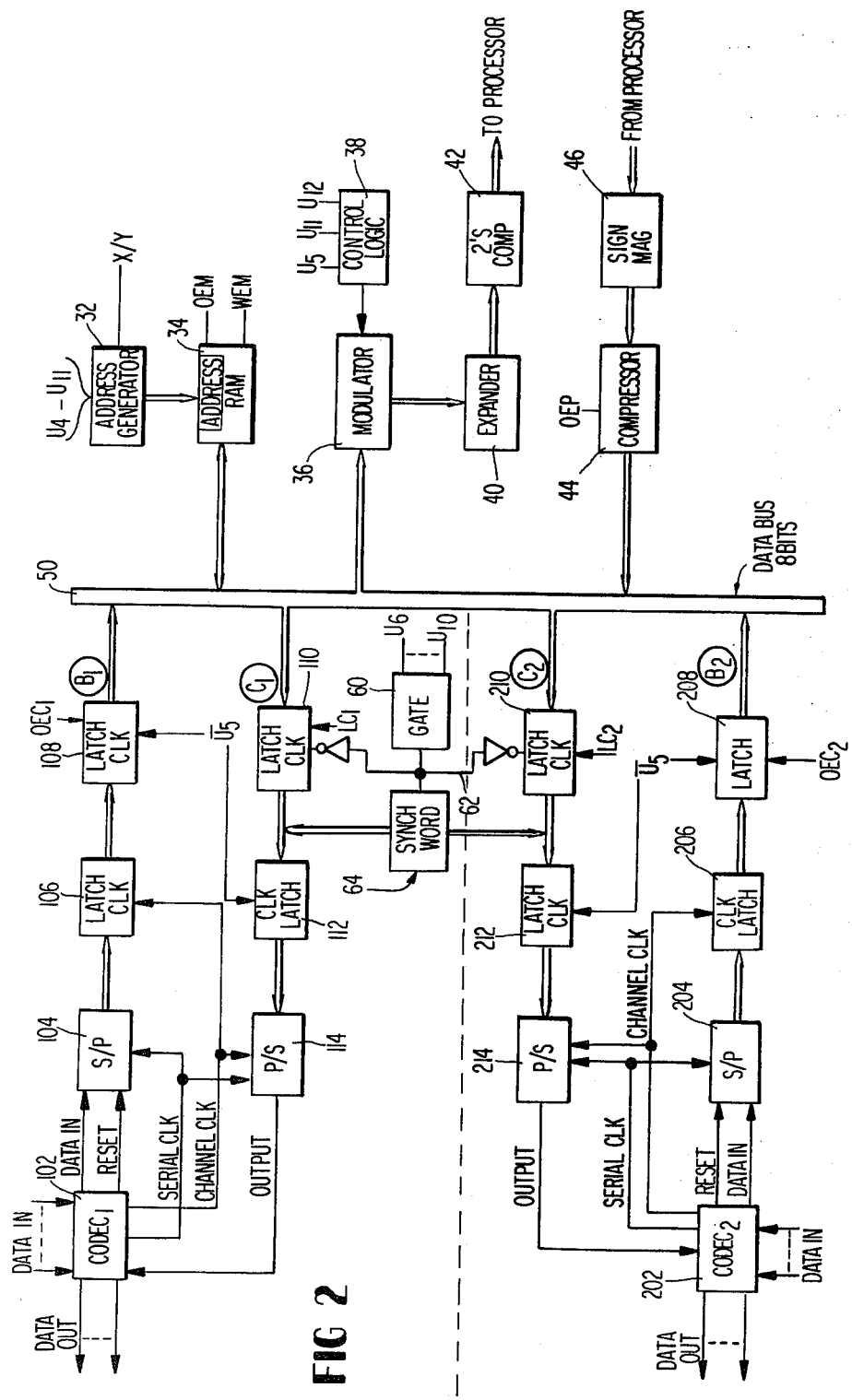
FIG. 2 is a more detailed illustration of the various elements contained in the interfacing apparatus.

The interfacing circuitry is shown in more detail in FIG. 2. Thirty channels of analog data are input to codecs 102 and 202 where they are each converted to 32 consecutive serial channels of digital PCM-TDM (Time Division Multiplex) data and applied to serial to parallel converters 104 and 204. The codecs (code/decode) such as the Ericsson ZAK 30/52 insert unique words in channels 0 and 16 to effectively provide 32 channels of data. The codecs also provide a reset pulse to serial to parallel converters 104 and 204 as shown to provide synchronization information to the interface circuit. The serial data is applied to converters 104 and 204 under the control of a serial clock which may for example be a 2.048 MHz clock. The converted data is strobed into latches 106 and 206 under the control of the Channel Clock provided by the codecs 102 and 202. The latches 106 and 206 therefore receive one PCM word from a single channel of data at a time and deliver the individual channel data to latches 108 and 208 under the control of clock pulse $\overline{U}_5$. The latches 108 and 208 contain the data words B1 and B2 as shown in the figure. The word B1 from latch 108 is delivered to random access memory 34 under the control of $OEC_1$ (Output Enable Control) applied to latch 108 and WEM (Write Enable Memory) applied to RAM 34. When signals $OEC_1$ and WEM are concurrently applied to latch 108 and RAM 34, respectively, the word B1 will be delivered from the latch to the RAM along tri-state bus 50. Data word B2 is similarly transfered from latch 208 to RAM 34 during the concurrent application of $OEC_2$ and WEM to latch 208 and RAM 34, respectively. The locations in memory to which words B1 and B2 are applied are determined by the addresses presently delivered to RAM 34 by the address generator 32 having clock inputs $U_4$ through $U_{11}$ applied thereto.

The B1 and B2 data are read out of memory 34 upon the application of signal OEM (Output Enable Memory) to the RAM. The data are then modulated by selectively changing the sign bit of the data words in accordance with the output of control logic 38 which has clock inputs $U_5$, $U_{11}$ and $U_{12}$ applied thereto. The function of modulator 36 will be described in more detail in connection with FIG. 5. The data are then delivered from modulator 36 to expander 40 where they are converted from 8 bit words to 12 bit words. The expander 40 and the compressor 44 are required in the interface circuit since the codecs operate on compressed data while the FDM/TDM processor operates on expanded data. The codecs used in accordance with the prefered embodiment of the invention employ A-law compression (European Standard), although the system can easily be adapted to use any particular type of compander technique such as $\mu$-law compression. Typical A-law expanders such as the one employed at 44 are well known in the art and do not comprise a significant portion of this invention. The expanded 12 bit data is delivered to 2's complement circuit 42 where the sign magnitude format of the data is converted to 2's complement format. The output from the 2's complement converter 42 is the desired input data in the correct format for the FDM/TDM processor and is delivered thereto.

Data to be delivered from the FDM/TDM processor to the codecs 102 and 202 is applied to sign magnitude converter 46 which converts the 2's complement data to sign magnitude data. The signal magnitude data is input to compressor means 44 where the data is compressed according to the particular expansion technique employed in expander 40. That is, if expander 40 expands according to the A-law, compressor 44 similarly compresses according to the A-law. Compressor 44 may be comprised of well-known data compressions circuits or may be designed in accordance with the disclosure of co-pending U.S. Patent Application Ser. No. 110,716, commonly assigned and concurrently filed herewith. The disclosure of U.S. Patent Application Ser. No. 110,716, is hereby incorporated by reference.

Data words are read from the compressor 44 to the random access memory 34 upon the concurrent application of control pulses OEP and WEM to compressor and random access memory, respectively. The 64 ordered channels of data from the processor are read sequentially into the random access memory 34 at particular locations determined by address generator means 34.

At the appropriate point in time, the data words which were read from compressor 44 into the memory are sequentially read out of memory under the control of signal OEM applied to the RAM and signals LC1 and LC2 applied to latches 110 and 210 respectively. The control pluses OEM, LC1 and LC2 are timed so that the 64 ordered channels in the random access memory are delivered in two groups of 32 channels to latches 110 and 210. The data channels delivered to latches 110 and 210 therefore correspond to the data words provided by latches 108 and 208 respectively. The data in latches 110 and 210 are strobed into latches 112 and 212 under the control of clock pulse $\overline{U}_5$. The data in latches 112 and 212 are finally delivered to parallel to serial converters 114 and 214 under the control of the Channel Clock and Serial Clock provided by the codec, where the serial output signals are provided to codecs 102 and 202.

As discussed above, codecs 102 and 202 each provide 30 channels of information and an additional two "unique word" channels at channels 0 and 16 may which provide synchronization information. Since both the interface circuit of FIG. 2 and the FDM/TDM processor regard the unique word channels 0 and 16 as any other information channel, the unique words at channel 0 and 16 will be processed in accordance with the FDM/TDM processing technique. (The data on channels 0 and 16 is eventually ignored by the Processor, however.) Inasmuch as the channel 0 and 16 are not true information channels, the data words which are delivered to latches 110 and 210 at channels 0 and 16 are meaningless. The unique words must therefore be reapplied into the data stream so that the codecs will have the proper unique words applied thereto. This process is accomplished by supplying clock lines $U_6$ through $U_{10}$ to gate 60. As will become apparent in the discussion of FIG. 3, clock lines $U_6$ through $U_{10}$ count through and determine the particular channel being processed. Gate 60 is simple combinatorial logic which detects the presence of channels 0 and 16. Upon the occurrence of these channels, the gate 60 provides a pulse on line 62 which disables latches 110 and 210 and enables latch 64 so that it delivers the unique word stored therein to latches 112 and 212. It should be noted that the particular technique of utilizing unique word channels will be in accordance with the particular requirements of the codecs employed.

The utilization of clock pulses $U_2$–$U_{12}$ and control pulses will now be discussed with reference to FIG. 3. The clock signal $U_2$ is 2.048 MHz. The frequency of the clock $U_2$ is successively divided by 2 to produce clock signals $U_3$ through $U_{12}$. The generation of clock pulses $U_2$–$U_{12}$ can be accomplished in any well-known manner.

The control signals OEC, OEP, OEM, WEM, LC and X/Y select can be generated by providing a PROM having inputs $U_2$ through $U_5$ applied thereto in a well-known manner. The generation of the control signals for one channel of the interface ($OEC_1$ and $LC_1$) is generally indicated in FIG. 4 using a Harries 7603 PROM, and having a buffered output. The control signal OEM can be generated directly from input $U_3$.

The enabling pulses OEC, OEP, OEM, WEM and LC enable the associated component when the control signal is in a low state. Between clock pulses T0 and T1 it can be seen that only control signal OEM is in a low state. The random access memory therefore performs a read operation delivering the data located at the address currently in address generator 32 to tri-state bus 50 where it is delivered to modulator 36. Inasmuch as the latches 110 and 210 are not enabled between T0 and T1 by control signals $LC_1$ or $LC_2$, the data path is exclusively from RAM 34 to modulator 36. Between clock pulses T1 and T2 it can be seen that $OEC_1$ and WEM achieve a low state. The signal $OEC_1$ strobes the data word in latch 108 onto tri-state bus 50 where it is delivered to RAM and written into memory under the control of signal WEM. It can be seen that latches 110 and 210 will not receive the data from latch 108 since the former latches are not concurrently provided with control signals $LC_1$ or $LC_2$. The data flow from latch 108 to random access memory 34 is however, not exclusive since modulator 36 is not controlled by a control input and will accept all data words delivered to bus 50. While the present invention could obviously provide for such an input control line to modulator 36, the input control is effected in the FDM/TDM processor by the control signal $X_{in}$ which is produced in the processor itself. In this manner, the processor is only provided with $B_1$ or $B_2$ data eminating from RAM 34 rather than from latches 108 and 208.

Between times T2 and T3 the control signals OEM and $LC_1$ are in a low state. The RAM will therefore read out the data word presently located at the address indicated by address generator 32 onto tri-state bus 50 where it is delivered to the enabled latch 110. Between times T3 and T4 the control signals OEP and WEM are in an low state. The signal OEP enables the compressor to strobe a data word onto tri-state bus 50 where it is delivered to RAM 34 and written into memory under the control of signal WEM. The location of the written word will again be determined by the address presently contained in address generator 32. Between clock pulses T4 and T5 only the signal OEM is in a low state. The RAM 34 responds thereto by reading out of memory and delivering the contents of the memory location to tri-state bus 50. As previously discussed uncontrolled modulator 36 is continuously receiving all data words delivered to tri-state bus 50. Reiterating, the FDM/TDM processor discriminates against those words which are not to be processed by the system by providing the control input $X_{in}$ as shown in FIG. 3. The data delivered to bus 50 by RAM 34 between times T4 and T5 will be properly accepted by the FDM/TDM processor in accordance with $X_{in}$.

Between times T5 and T6 the control signals OEC2 and WEM are low. The signal OEC2 strobes the data in latch 208 onto tri-state bus 50 where it is delivered to RAM 34 and written into memory at the address indicated in generator 32. Between times T6 and T7, control signals OEM and $LC_2$ are low causing RAM 34 to deliver a data word to latch 210. Between times T7 and T8 control signals OEP and WEM are low to enable compressor 44 to deliver a word to RAM 34 where it is written in a location determined by generator means 32.

Thus it can be seen that the interface provides for a two-way read/write operation in rapid succession. Data words are delivered from codecs 102 and 202 to the random access memory where they are written in ordered form. This ordered data is subsequently read out of memory and delivered to the FDM/TDM processor. On the outgoing path, the ordered data words are delivered to random access memory where they are written into specified memory locations, and subsequentially read out on two separate paths to codecs 102 and 202.

The function of address generator 32 will now be described in accordance with Table 1 and FIGS. 3 and 5. Table 1 shows the address which is generated at various times within the read/write cycle described with reference to FIG. 3. $A_7$ is the most significant bit of the address. $U_4$ through $U_{11}$ determine the read/write address as shown.

TABLE 1

|  |  | $A_7$ | $A_6$ | $A_5$ | $A_4$ | $A_3$ | $A_2$ | $A_1$ | $A_0$ | FORMAT |
|---|---|---|---|---|---|---|---|---|---|---|
| Incoming | $[R_A]$ | $U_4$ | $U_{11}$ | $U_{10}$ | $U_9$ | $U_8$ | $U_7$ | $U_6$ | $U_5$ | X |
| Data | $[W_A]$ | $U_4$ | $U_{11}$ | $U_5$ | $U_{10}$ | $U_9$ | $U_8$ | $U_7$ | $U_6$ | Y |
| Return | $[R_A]$ | $U_4$ | $U_{11}$ | $U_5$ | $U_{10}$ | $U_9$ | $U_8$ | $U_7$ | $U_6$ | Y |
| Data | $[W_A]$ | $U_4$ | $U_{11}$ | $U_{10}$ | $U_9$ | $U_8$ | $U_7$ | $U_6$ | $U_5$ | X |

As seen from the table, two distinct address formats are generated by address generator 32. The first or X-format is shown as $U_4$, $U_{11}$, $U_{10}$, $U_9$, $U_8$, $U_7$, $U_6$, $U_5$ while the second or Y-format is shown as $U_4$, $U_{11}$, $U_5$, $U_{10}$, $U_9$, $U_8$, $U_7$, $U_6$. The particular format generated by the address generator 32 is determined by the X/Y select signal as shown in FIG. 3 and applied to address generator 32. The specific details of the address generator will be described with reference to FIG. 4.

Figure 3:
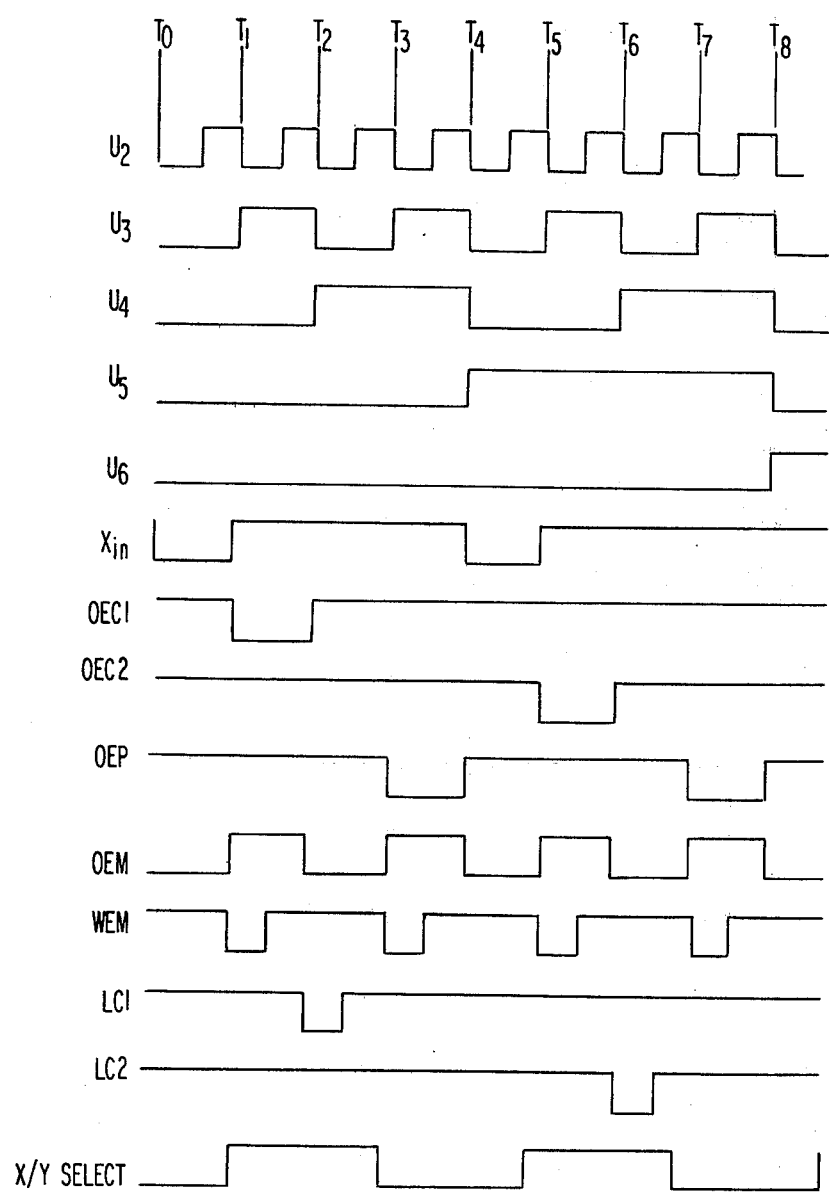
FIG. 3 is a timing chart which illustrates the time relationship of the clock and control pulses.

As defined in the timing diagram of FIG. 3, data is read out from RAM 34 to the modulator 36 between times T0 and T1. This is indicated in FIG. 5 by the arrow leaving the memory 50 at time T0 containing data B1 and B2 from latches 108 and 208 respectively. At time T0 the value of clock signals $U_4$ through $U_{11}$ are all 0. Since the X/Y select line is in the X format (low state) the X format will be generated from address generator 32. The address so generated between times T0 and T1 will consequently correspond to memory location 0. Thus, data B1/B2 is illustrated as eminating from memory 50 at time T0 from memory location 0. As the clock pulses count through a number of cycles, it can easily be seen that the B1/B2 data will be read out of successively increasing memory locations with time.

Between times T1 and T2 data from latch 108 is read into random access memory 34. During this time, the values of $U_4$ through $U_{11}$ have still not changed from their 0 states, but the format from address generator 32 has changed in accordance with the X/Y select signal applied thereto. The data word from latch 108 therefore is read into memory location 64 in accordance with format Y and as shown in FIG. 5. Between clock periods T2 and T3a data word is read from RAM 34 and delivered to latch 110. The data word so delivered is taken from memory location 192 as shown in FIG. 5. This is due to the fact that between times T2 and T3, $U_4$ has changed to a high state. Since both $U_4$ and $\overline{U}_{11}$ are both high, the memory location 192 (128+64) is generated. The process described with respect to times T0, T1 and T2 is simply repeated for all subsequent time periods.

Figure 5:
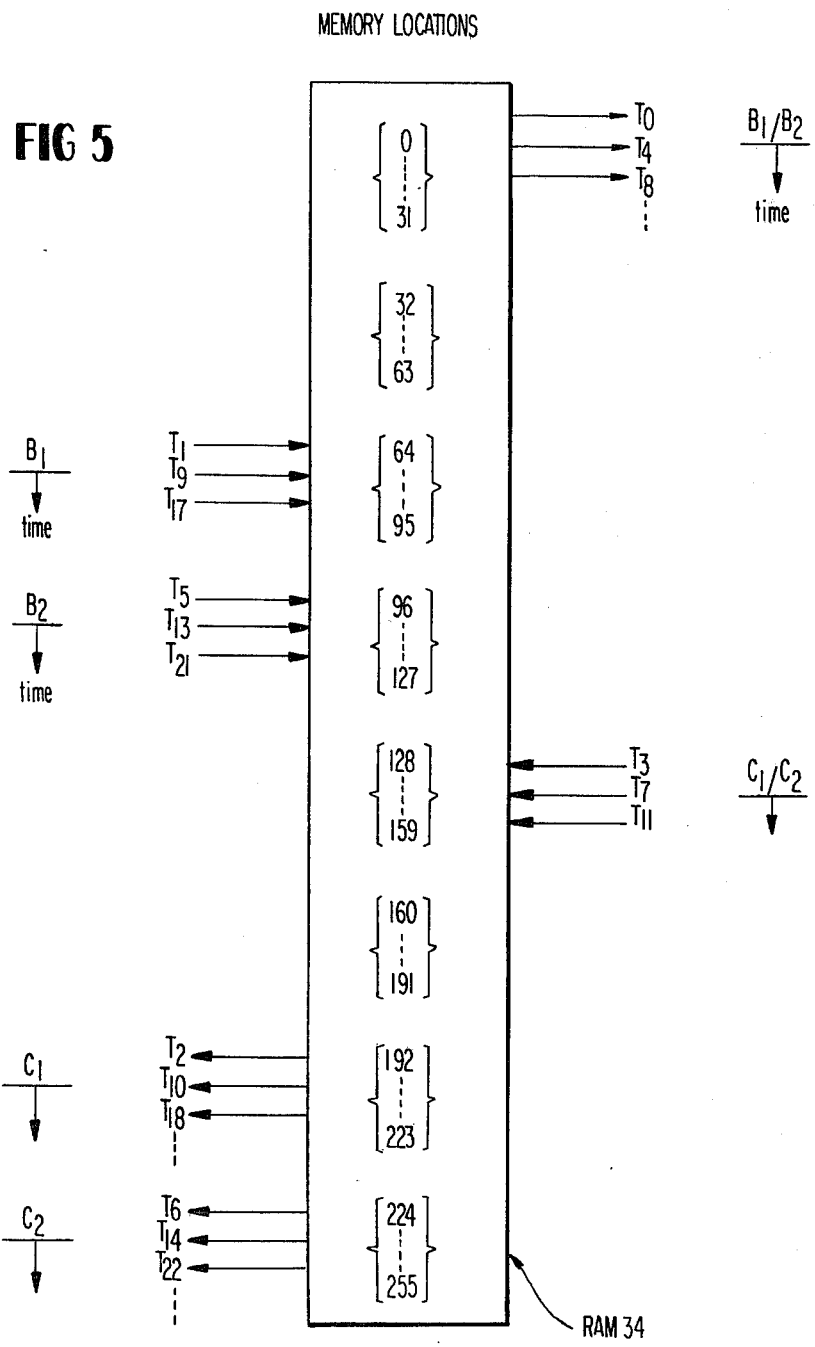
FIG. 5 illustrates the read and write locations for the two-way data path in the random access memory.

An inspection of FIG. 5 illustrates that during the first four time periods (T0 through T3) B1/B2 data is read out of memory, B1 data is read into memory, C1 data is read out of memory, and C1/Cs data is read into memory. During the second four time periods (T4 through T7), B1/B2 data is similarly read out of memory, C1/C2 data is similarly read into memory, but now B2 data is read into memory as well as C2 data being read out of memory. Each of the read/write memory locations are successively circulated synchronously within the memory.

It should be noted that the B1 and B2 data words which are successively read into memory once every four time periods, are separated by 32 memory locations. After being so ordered (and after the memory locations have been circulated after a given amount of time) and B1/B2 data is read out of memory in a sequence so as to simulate a continuous 64 channel data flow. Conversely when the C1/C2 data is read into memory in sequence, the C1 and C2 data words are read out separately and separated by 32 memory locations so as to simulate two independent 32 channel data inputs.

The address generation in accordance with the present invention is shown schematically in FIG. 4. As mentioned above, the basic controls signals are provided by programmable read only memory 302 under the control of clock inputs $U_2$ through $U_5$. One of the control inputs so provided is the X/Y select line. The X/Y signal is directly applied to buffer/driver 306 while the inverted X/Y signal is applied to buffer/driver 308. The clock inputs $U_4$–$U_{11}$ in accordance with format X are provided to the buffer 308 while the clock inputs $U_4$–$U_{11}$ in accordance with format Y are applied to buffer 306. The outputs of each of the buffers 306 and 308 are tied together and are selectively enabled under the control of X/Y to thereby generate the address which is delivered to the random access 34.

The modulation process employed at modulator 36 and control logic 38 will now be discussed with reference to FIG. 6 herein and with respect to FIGS. 1-8 of co-pending Application Ser. No. 849,584, the disclosure of which has been incorporated by reference. In Ser. No. 849,584, it can be seen in FIGS. 7A and 7B that the FDM/TDM processor operates by shifting the odd-numbered PCM data channels down by 2 KHz and by shifting the odd-numbered PCM channels up by 2 KHz. This is effected by employing the scheme shown in FIG. 5 of the co-pending application. The shifting is accomplished by selectively complementing PCM data words throughout a four-frame cycle. In the first frame of the cycle (N=0) none of the data words in the 64 channels are complemented. In the second frame (N=1) only the even channel data words are complemented. In the third frame of the cycle (N=2) both the even and the odd channel data words are complemented. In the fourth and last frame of the cycle (N=3) only the odd-numbered data channel words are complemented. The next frame in the cycle is defined as N=0 and the process is repeated.

The present invention provides for the selectively complementing the data words in accordance with the teachings of Ser. No. 849,584 due to the fact that the interfacing circuits shown in figure two operate on sign magnitude data rather than 2's complement data as in the FDM/TDM processor. The inherent advantage of complementing sign magnitude numbers as opposed to 2's complement numbers is readily apparent inasmuch as only one bit (sign bit) need be complemented in the sign magnitude format. The clock signal $U_5$ in the present invention (256 KHz) corresponds to a number of channels L for each of the 64 channels handled by the interface circuits. Every 64 channel segment corresponds to a single frame of TDM data in accordance with the teachings of the co-pending application. The frame number information is provided by the transition of signal $U_{11}$ inasmuch as there are 64 transitions of the clock pulse $U_5$ within one transition of the clock pulse $U_{11}$ (4 KHz). $U_{11}$ therefore, in conjunction with $U_{12}$ can keep track of the particular frame number presently being processed.

The logic shown in FIG. 6 illustrates the control logic 38 of figure two. The logic function $(\overline{U}_5 U_{11})$ XOR $U_{12}$ is affected by the AND and exclusive OR gates shown in FIG. 6 Modulator 36 in FIG. 2 merely complements the sign bit of the data word presented to it whenever the output of the logic in FIG. 6 has a high value. The logic in FIG. 6 therefore performs the necessary function of shifting the even channels up by 2 KHz and the odd channels down by 2 KHz in accordance with the teachings of the co-pending application.

An apparatus has thus been disclosed which provides an interface between two 30 channel codecs providing serial data in compressed, sign magnitude form and an FDM/TDM processor which accepts 60 channels of parallel data in expanded 2's complement format. The apparatus further provides for a simplified modulation of the sign magnitude data by complementing a single bit of selected data words.

Various changes, additions and omissions of elements may be made within the scope and spirit of the invention and it is to be understood that the invention is not limited to specific details, examples and perfered embodiments shown and described.

I claim:
1. An interface circuit comprising:
   a first data source providing a plurality of N time multiplexed data channels $A_i$, where i is $\leq N$;

a second data source providing a plurality of N time multiplexed data channels $B_i$;

first and second register means associated with said first and second data sources, respectively, for accepting data words from said associated data sources;

control signal generating means for providing selective control of said first and second register means, said first and second register means providing outputs in accordance with said control signal generating means;

memory means for receiving said first and second register outputs;

a clock input;

address generating means for receiving said clock input and generating addresses in accordance with said clock input and providing said addresses to said memory means;

said clock input and said control signal generating means providing a first set of concurrent signals to (i) one of said first and second register means, (ii) said memory means, and (iii) said address generating means, so as to cause said one of said register means to write its associated data words at memory locations defined by said address generating means, said address generating means generating first and second sets of sequential addresses separated by a number of sequential addresses substantially equal to the number of data channels provided by one of said first and second data sources, said first set of concurrent signals including said first set of sequential addresses when supplied to said first register means and including said second set of sequential addresses when supplied to said second register means, said first set of concurrent signals being alternately provided to said first and second register means at different times whereby the data from channels $A_1$-$A_N$ are stored at a first sequence of memory locations, and the data from channels $B_1$-$B_N$ are stored at a second sequence of memory locations beginning substantially at the end of said first sequence of memory locations.

2. An interface circuit comprising:

(a) first and second data sources, each of said data sources providing a plurality of N time multiplexed data channels;

(b) first and second register means associated with said first and second data sources, respectively, for accepting data words from said associated data sources, each of said first and second register means comprising incoming data registers and return data registers;

(c) control signal generating means for providing selective control of said first and second register means, said first and second register means providing outputs in accordance with said control signal generating means;

(d) memory means for receiving said first and second register outputs, said memory means having address generator means attached thereto;

(e) a clock input;

(f) said address generating means generating addresses in accordance with said clock input and providing said address to said memory means;

(g) wherein said clock input and said control signal generating means provide a first set of concurrent signals to (i) one of said first and second register means, (ii) said memory means, and (iii) said address means, so as to cause said one of said register means to write its associated data word into said memory in a location defined by said address generating means;

(h) said interface circuit further comprising data processing means in communication with said memory means wherein said clock input and said control signal generating means provide a second set of concurrent signals to said memory means and said address generating means so as to cause said memory means to transmit a data word to said data processing means from a memory location defined by said address generating means; and (i) said clock input and said control signal generating means providing a third set of concurrent signals to (i) said return data register of one of said first and second register means, (ii) said memory means, and (iii) said address means, so as to deliver to said return data register of one of said first and second register means an associated data word from said memory from a location defined by said address generating means.

3. An interface circuit comprising:

(a) first and second data sources, each of said data sources providing a plurality of time multiplexed data channels;

(b) first and second register means associated with said first and second data sources, respectively, for accepting data words from said associated data sources;

(c) control signal generating means for providing selective control of said first and second register means, said first and second register means providing outputs in accordance with said control signal generating means;

(d) memory means for receiving said first and second register outputs, said memory means having address generator means attached thereto;

(e) a clock input;

(f) said address generating means generating addresses in accordance with said clock input and providing said address to said memory means;

(g) said clock input and said control signal generating means providing a first set of concurrent signals to (i) one of said first and second register means, (ii) said memory means, and (iii) said address means, so as to cause said one of said register means to write its associated data word into said memory in a location defined by said address generating means; said interface circuit further comprising:

(h) data processing means in communication with said memory means wherein said clock input and said control signal generating means provide a second set of concurrent signals to said memory means and said address means so as to cause said memory means to transmit a data word to said data processing means from a memory location defined by said address means;

(i) serial-to-parallel and parallel-to-serial conversion means intermediate each said first and second data sources and said first and second register means, respectively;

(j) means for modulating said data words transmitted from said memory means under control of said second set of concurrent signals; to provide modulated data (k) means for expanding said modulated data to provide expanded data;

(l) means for converting the format of said expanded data to provide 2's complement data;

(m) means for converting the format of data received from said data processor to sign magnitude data; and (n) means for compressing said sign magnitude data;

(o) said means for modulating, expanding, compressing, 2's complement format converting and sign magnitude format converting located intermediate said memory means and said data processing means.

4. An interface circuit comprising:

(a) first and second data sources, each of said data sources providing a plurality of time multiplexed data channels;

(b) first and second register means associated with said first and second data sources, respectively, for accepting data words from said associated data sources;

(c) control signal generating means for providing selective control of said first and second register means, said first and second register means providing outputs in accordance with said control signal generating means;

(d) memory means for receiving said first and second register outputs, said memory means having address generator means attached thereto;

(e) a clock input;

(f) said address generating means generating addresses in accordance with said clock input and providing said address to said memory means;

(g) said clock input and said control signal generating means providing a first set of concurrent signals to (i) one of said first and second register means, (ii) said memory means, and (iii) said address means, so as to cause said one of said register means to write its associated data word into said memory in a location defined by said address generating means; said interface circuit further comprising:

(h) data processing means in communication with said memory means wherein said clock input and said control signal generating means provide a second set of concurrent signals to said memory means and said address means so as to cause said memory means to transmit a data word to said data processing means from a memory location defined by said address means; and (i) modulating means for modulating in accordance with said clock input said data words transmitted from said memory under control of said second set of concurrent signals.

5. The interface circuit of claim 1 further comprising data processing means in communication with said memory means wherein said clock input and said control signal generating means provide a second set of concurrent signals to said memory means and said address generating means so as to cause said memory means to transmit a data word to said data processing means from a memory location defined by said address generating means.

6. The interface circuit of claim 2 wherein said clock input and said control signal generating means provide a fourth set of concurrent signals to said memory means, said address means, and said data processing means, so as to cause said memory means to read a data word from said data processing means into a memory location defined by said address means.

7. The interface circuit of claim 2 wherein said third set of concurrent signals are alternately provided to said return data register of (a) said one of said first and second register means and (b) to the other of said first and second register means at different times and wherein said address means causes data to be delivered to said return data registers from first and second increasing memory locations.

8. The interface circuit of claim 7 wherein said first and second increasing memory locations are separated by a number of locations substantially equal to the number of data channels provided by one of said first and second data sources.

9. The interface circuit of claim 4 wherein said modulator selectively complements said data words in accordance with said clock input.

10. The interface circuit of claim 9 wherein said modulation results in a frequency shifting of said time multiplexed data channels.

11. In a data transmission system having first and second data sources each having a first number of channels, a memory for receiving data provided by said sources, data processing means for receiving data provided by said memory and having a second number of channels being greater than said first number of channels, data flow control means for controlling the flow of data from said first and second data sources to said memory and from said memory to said data processing means, and memory address control means for controlling the location of data received by and transmitted from said memory, a method of multiplexing said first and second data sources comprising:

(a) alternately providing said memory with data from said first and second data sources;

(b) writing said alternately provided data into said memory at first and second alternating and increasing memory locations during memory write cycles said first and second alternating memory locations being separated in said memory by a number of locations substantially equal to said first number of channels;

(c) interleaving said memory write cycles with memory read cycles wherein data words are read from said memory at third increasing memory locations and provided to said data processing means.

* * * * *

UNITED STATES PATENT AND TRADEMARK OFFICE
CERTIFICATE OF CORRECTION

PATENT NO. : 4,324,000
DATED : April 6, 1982
INVENTOR(S) : Zaheer Ali

It is certified that error appears in the above—identified patent and that said Letters Patent is hereby corrected as shown below:

Col. 3, line 54, delete "transfered" and insert --transferred--.

Col. 4, line 23, delete "signal" and insert --sign--.

Col. 6, line 60, delete "$U_{11}$" and insert --$\overline{U}_{11}$--.

Col. 7, line 33, delete "C1/Cs" and insert --C1/C2--.

Col. 8, line 45, after "Fig. 6" insert a period.

Col. 8, line 63, delete "perfered" insert --preferred--.

Signed and Sealed this

Twenty-seventh Day of July 1982

[SEAL]

Attest:

Attesting Officer

GERALD J. MOSSINGHOFF
Commissioner of Patents and Trademarks